(12) United States Patent
Thomas et al.

(10) Patent No.: US 11,614,961 B2
(45) Date of Patent: Mar. 28, 2023

(54) GENERATING CLOUD WORKFLOWS FROM LOCAL WORKFLOWS

(71) Applicant: Hewlett-Packard Development Company, L.P., Spring, TX (US)

(72) Inventors: Marcus Allen Thomas, San Diego, CA (US); Steve T Breidenbach, San Diego, CA (US); Laurel Lasslo, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 17/047,626

(22) PCT Filed: Jun. 5, 2018

(86) PCT No.: PCT/US2018/036073
§ 371 (c)(1),
(2) Date: Oct. 14, 2020

(87) PCT Pub. No.: WO2019/236068
PCT Pub. Date: Dec. 12, 2019

(65) Prior Publication Data
US 2021/0149714 A1    May 20, 2021

(51) Int. Cl.
*H04L 67/10*    (2022.01)
*G06F 9/48*     (2006.01)
*G06F 9/54*     (2006.01)

(52) U.S. Cl.
CPC ............ *G06F 9/4856* (2013.01); *G06F 9/541* (2013.01); *H04L 67/10* (2013.01)

(58) Field of Classification Search
CPC ................................. G06F 9/4856; H04L 67/10
See application file for complete search history.

(56) References Cited

U.S. PATENT DOCUMENTS 9,866,964 B1 *  1/2018  Haskin ................... H04R 27/00
2002/0144019 A1  10/2002  Gooding
(Continued)

FOREIGN PATENT DOCUMENTS

| CN | 103023943 B | 6/2016 |
| EP | 3094072 | 11/2016 |

(Continued)

*Primary Examiner* — Hua Fan
(74) *Attorney, Agent, or Firm* — Brooks, Cameron & Huebsch, PLLC

(57) ABSTRACT

A system includes a machine readable storage medium storing instructions and a processor to execute the instructions. The instructions include receiving a local workflow including a native action from a first user device and determining whether information to execute the native action as a cloud action is complete. In response to determining that information for the native action is complete, determining whether a comparable cloud action is available for the native action. In response to determining that a comparable cloud action is available for the native action, saving the native action as a cloud action in a cloud work-flow. In response to determining that a comparable cloud action is not available for the native action or in response to determining that information to execute the native action is not complete, saving the native action as a local action in the cloud workflow.

10 Claims, 7 Drawing Sheets

(56) References Cited

U.S. PATENT DOCUMENTS

| | | | |
|---|---|---|---|
| 2010/0318999 A1 | 12/2010 | Zhao | |
| 2016/0080284 A1 | 3/2016 | Jeon | |
| 2016/0150517 A1 | 5/2016 | Wang | |
| 2020/0192975 A1* | 6/2020 | Maes | H04L 67/10 |

FOREIGN PATENT DOCUMENTS

| | | |
|---|---|---|
| JP | 2013084137 | 5/2013 |
| WO | WO-2010058989 A1 | 5/2010 |
| WO | WO-2015061787 | 4/2015 |

* cited by examiner

GENERATING CLOUD WORKFLOWS FROM LOCAL WORKFLOWS

BACKGROUND

Devices, such as smart phones, tablets, computers, printers, etc., may include a native functionality and/or a cloud functionality. For example, a device, such as a printer, may include native functionality (e.g., print, copy, scan) and cloud functionality (e.g., send to email, save to a cloud storage service). A device, such as a printer, may combine these native functions and cloud functions to perform a workflow (e.g., make one copy and send to email). In another example, a device, such as a smartphone, may include just native functionality (e.g., print, copy, scan from phone, send to email, save to a cloud storage service). A device, such as a smartphone, may combine these native functions to perform a workflow.

DETAILED DESCRIPTION

Figure 1:
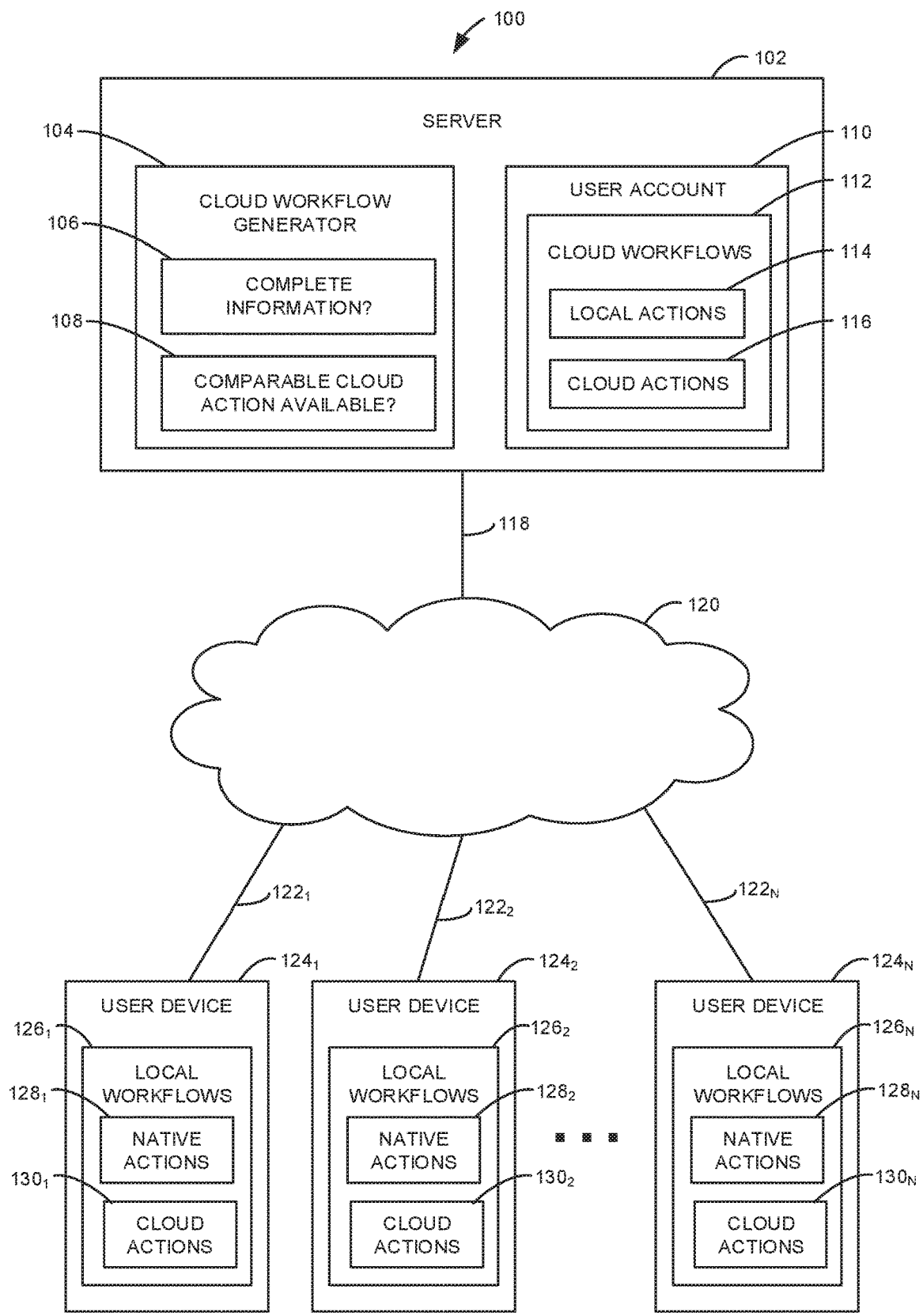
FIG. 1 is a block diagram illustrating one example of a system for generating cloud workflows from local workflows.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

As used herein, the term "native action" includes a set of instructions to execute which may include a connection to a third party application programming interface (API) or another interface such as a printer, network interface, software interface, etc. A native action is executed on a consumer driven user device using a device specific operating system.

As used herein, the term "cloud action" includes a set of instructions to execute which may include a connection to a third party API or any other API. A cloud action is executed on a server or similar device.

As used herein, the term "local workflow" includes a set of native actions which comprise a set of instructions to execute. A local workflow may be stored on a consumer driven user device and executed on the consumer driven user device.

As used herein, the term "cloud workflow" includes a set of cloud actions and/or local actions which comprise a set of instructions to execute. A cloud workflow may be stored on a server or similar device and may be executed on the server or similar device.

As used herein, the term "local action" includes a set of instructions to be executed on a consumer driven (i.e., native) user device. A local action is different from their native action counterpart in that a local action is stored in a cloud workflow and not in a local workflow. A local action may have incomplete information, which may be completed at the time of execution.

Devices and applications that enable multiple functions for users may involve users interacting separately with different devices and/or services. Even when combining functions into a workflow that includes the desired operations, interactions with each device and/or application are used to complete each specific portion. For example, if a workflow includes printing a copy of a document, saving a copy of the document to a cloud storage service, and emailing the document to a phone contact, a user interacts with three different systems and/or applications to complete the workflow. For printing a copy of the document, the user is involved in connecting their device to a printer via Wi-Fi or another network. For saving a copy of the document to the cloud storage service, the user is involved in allowing a cloud solution to connect to their cloud storage service and save the document on their behalf. For emailing a copy of the document to a phone contact, the user is involved in entering the message and the subject of the email into the native mail application of their device.

Even though a user may create and run workflows on a device, if those workflows include native actions, the user may have difficulty recreating or running the workflow on a different device. If another device does not include those native actions, or if the other device completes those native actions in a different way (e.g., with a different operating system), either the workflow or the other device software/firmware would need to be modified to allow the workflow to run on the other device. Since the user is involved in interactions on each device and/or application to complete a workflow, for times when the user is away from home or at another device, they may have difficulty recreating a workflow.

Accordingly, disclosed herein is a system including a plurality of user devices communicatively coupled to a server (e.g., cloud server). Local workflows generated on one user device are transformed into cloud workflows such that the cloud workflows may be run by any of the user devices. A cloud workflow generated from a local workflow may include cloud actions (which may have previously been native actions) and/or local actions (native actions that do not yet have a comparable cloud action and are executed by the user device). The local actions are transformed to cloud actions as the information and/or cloud components needed to transform the local actions to cloud actions are obtained and/or collected. Eventually, all local actions in a cloud workflow may transform to cloud actions to complete the cloud workflow.

FIG. 1 is a block diagram illustrating one example of a system 100 for generating cloud workflows from local workflows. System 100 includes a server 102, a network 120, and a plurality of user devices 124$_1$ to 124$_N$ (collectively referred to as user devices 124), where "N" is any suitable number of devices. Server 102 includes a cloud workflow generator 104 and a user account 110. While server 102 illustrates one user account 110 in FIG. 1, in other examples server 102 may include any suitable number of user accounts. User account 110 stores cloud workflows 112, where each cloud workflow includes local actions 114 and/or cloud actions 116. Local actions 114 may be executed by a user device $124_1$ to $124_N$, while cloud actions 116 may be executed by a cloud device, such as server 102. User account 110 may be accessed by users of user devices $124_1$ to $124_N$, for example, by logging into user account 110.

Each user device $124_1$ to $124_N$ stores local workflows $126_1$ to $126_N$ where each local workflow includes native actions $128_1$ to $128_N$ and/or cloud actions $130_1$ to $130_N$, respectively. Each user device $124_1$ to $124_N$ is electrically coupled to network 120 through a communication path $122_1$ to $122_N$, respectively. Network 120 is electrically coupled to server 102 through a communication path 118. Network 120 may include a local area network (LAN), a wide area network (WAN), the internet, or any suitable combination thereof. Communication path 118 and communication paths $122_1$ to $122_N$ may include wired or wireless communications paths or a combination thereof.

Each user device 124 may include, for example, a cellular telephone, a tablet, a printer, a desktop computer, a laptop computer, a smart speaker, a smart display, or another suitable device. Each user device 124 may also include, for example, an iOS device, a Mac OS device, an Android device, a Fire OS device, a Chrome OS device, a Windows OS device, or a device including another suitable operating system. Each user device 124 may run native actions and/or cloud actions. The native actions and/or cloud actions may be combined into local workflows $126_1$ to $126_N$ for each device. A native action $128_1$ to $128_N$ of a local workflow $126_1$ to $126_N$ may be executed by the user device $124_1$ to $124_N$, while a cloud action $130_1$ to $130_N$ of a local workflow may be executed by a cloud device, such as server 102, respectively.

When a user executes a local workflow, server 102 attempts to transform or convert the local workflow to a cloud workflow 112 that may be run across different devices and operations systems. For each action of a local workflow, cloud workflow generator 104 determines whether the action is a native action or a cloud action. If the action is a cloud action, cloud workflow generator 104 saves the cloud action in a corresponding cloud workflow 112 as a cloud action 116. A cloud action 116 of a cloud workflow 112 may be executed by server 102.

If the action is a native action, at 106 cloud workflow generator 104 determines whether the information to execute the action as a cloud action is complete and can be passed to server 102. The information may include metadata or any other information needed to properly execute the action, such as authentication data, a folder directory, path, email subject line, or other information. If the information is incomplete, cloud workflow generator 104 saves both any information that could be passed to server 102 and the native action in the corresponding cloud workflow 112 as a local action 114. A local action 114 of a cloud workflow 112 may be executed by a user device.

If the information is complete, at 108 cloud workflow generator 104 determines whether a comparable cloud action is available (i.e., developed) for the native action. If a comparable cloud action is available, cloud workflow generator 104 saves the native action in the corresponding cloud workflow 112 as a cloud action 116. If a comparable cloud action is not available, cloud workflow generator 104 saves both the information passed to server 102 and the native action in the corresponding cloud workflow 112 as a local action 114.

On the next running of the workflow after a cloud workflow corresponding to the local workflow has been generated, cloud workflow generator 104 determines whether each action of the cloud workflow is a local action or a cloud action. If an action is a cloud action, the action is executed by server 102. If the action is a local action, at 108 cloud workflow generator 104 determines whether a comparable cloud action is available for the local action. If a comparable cloud action is still not available for the local action, the local action is executed by a user device and any available information for the action is saved for the next execution as part of the local action 116.

If a comparable cloud action is now available for the local action, at 106 cloud workflow generator 104 determines whether the information to execute the action as a cloud action is complete enough to generate a comparable cloud action. If the information is complete enough, the local action 114 is saved as a cloud action 116 and the cloud action is executed by server 102. If the information is not complete enough, the missing information is collected by server 102 and/or a user device. The local action 114 is then saved as a cloud action 116 and the cloud action is executed by server 102.

In this way, each local action 114 of a cloud workflow 112 may eventually be transformed into a cloud action 116. Once each local action 114 is transformed into a cloud action 116, the cloud workflow 112 may be run across different user devices and operating systems.

Figure 2A:
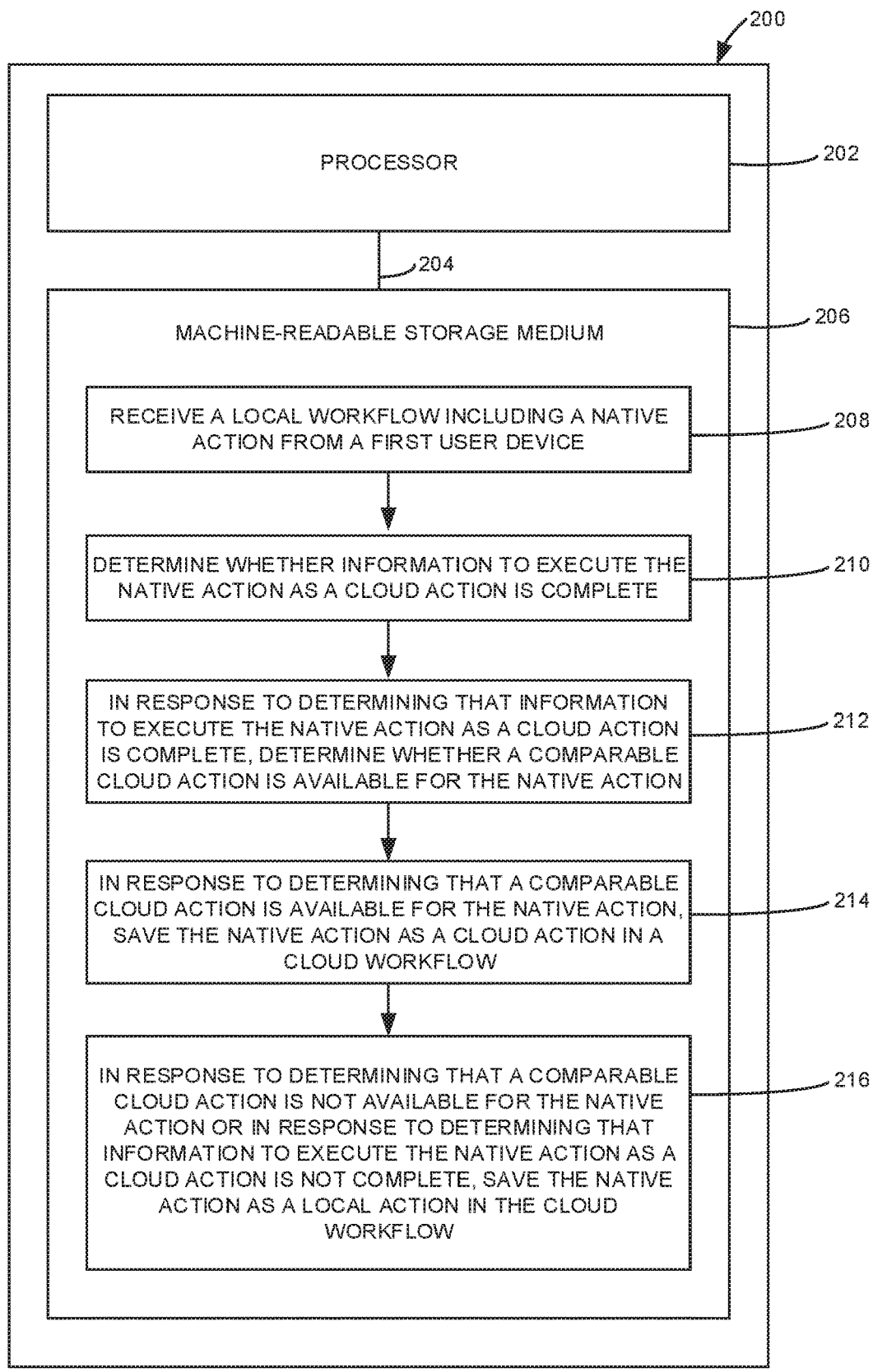
FIGS. 2A-2B are block diagrams illustrating one example of a cloud processing system for generating cloud workflows from local workflows.
Figure 2B:
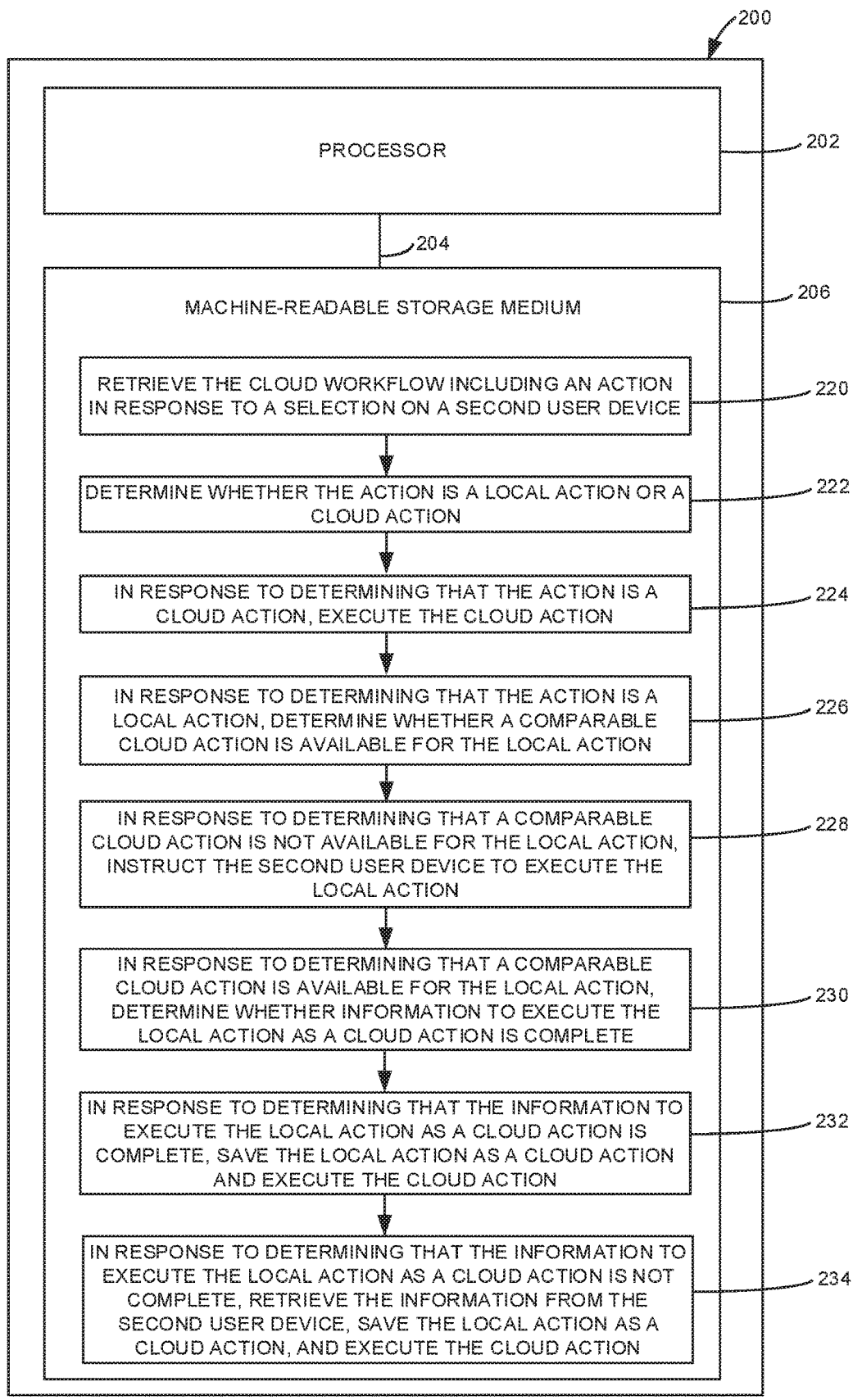

FIGS. 2A-2B are block diagrams illustrating one example of a cloud processing system 200 for generating cloud workflows from local workflows. In one example, system 200 includes a server, such as server 102 previously described and illustrated with reference to FIG. 1. System 200 includes a processor 202 and a machine-readable storage medium 206. Processor 202 is communicatively coupled to machine-readable storage medium 206 through a communication path 204. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 202 includes one (i.e., a single) central processing unit (CPU) or microprocessor or more than one (i.e., multiple) CPU or microprocessor, and/or other suitable hardware devices for retrieval and execution of instructions stored in machine-readable storage medium 206. Processor 202 may fetch, decode, and execute instructions 208-234 to generate cloud workflows from local workflows.

Processor 202 may fetch, decode, and execute instructions 208 to receive a local workflow including a native action from a first user device. In one example, processor 202 may execute further instructions to receive the local workflow including the native action and a cloud action from the first user device, and save the cloud action in a cloud workflow. Processor 202 may fetch, decode, and execute instructions 210 to determine whether information to execute the native action as a cloud action is complete. The information may include authentication data or other data for executing the action. Processor 202 may fetch, decode, and execute instructions 212 to in response to determining that information to execute the native action as a cloud action is complete, determine whether a comparable cloud action is available for the native action.

Processor 202 may fetch, decode, and execute instructions 214 to in response to determining that a comparable cloud action is available for the native action, save the native action as a cloud action in the cloud workflow. Processor 202 may fetch, decode, and execute instructions 216 to in response to determining that a comparable cloud action is not available for the native action or in response to determining that information to execute the native action as a cloud action is not complete, save the native action as a local action in the cloud workflow.

As illustrated in FIG. 2B, processor 202 may fetch, decode, and execute further instructions 220 to retrieve the cloud workflow including an action in response to a selection on a second user device. Processor 202 may fetch, decode, and execute further instructions 222 to determine whether the action is a local action or a cloud action. Processor 202 may fetch, decode, and execute further instructions 224 to in response to determining that the action is a cloud action, execute the cloud action. Processor 202 may fetch, decode, and execute further instructions 226 to in response to determining that the action is a local action, determine whether a comparable cloud action is available for the local action.

Processor 202 may fetch, decode, and execute further instructions 228 to in response to determining that a comparable cloud action is not available for the local action, instruct the second user device to execute the local action. Processor 202 may fetch, decode, and execute further instructions 230 to in response to determining that a comparable cloud action is available for the local action, determine whether information to execute the local action as a cloud action is complete. Processor 202 may fetch, decode, and execute further instructions 232 to in response to determining that the information to execute the local action as a cloud action is complete, save the local action as a cloud action and execute the cloud action. Processor 202 may fetch, decode, and execute further instructions 234 to in response to determining that the information to execute the local action as a cloud action is not complete, retrieve the information from the second user device, save the local action as a cloud action, and execute the cloud action.

As an alternative or in addition to retrieving and executing instructions, processor 202 may include one (i.e., a single) electronic circuit or more than one (i.e., multiple) electronic circuit comprising a number of electronic components for performing the functionality of one of the instructions or more than one of the instructions in machine-readable storage medium 206. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 206 is a non-transitory storage medium and may be any suitable electronic, magnetic, optical, or other physical storage device that stores executable instructions. Thus, machine-readable storage medium 206 may be, for example, random access memory (RAM), an electrically-erasable programmable read-only memory (EEPROM), a storage drive, an optical disc, and the like. Machine-readable storage medium 206 may be disposed within system 200, as illustrated in FIGS. 2A-2B. In this case, the executable instructions may be installed on system 200. Alternatively, machine-readable storage medium 206 may be a portable, external, or remote storage medium that allows system 200 to download the instructions from the portable/external/remote storage medium. In this case, the executable instructions may be part of an installation package.

Figure 3A:
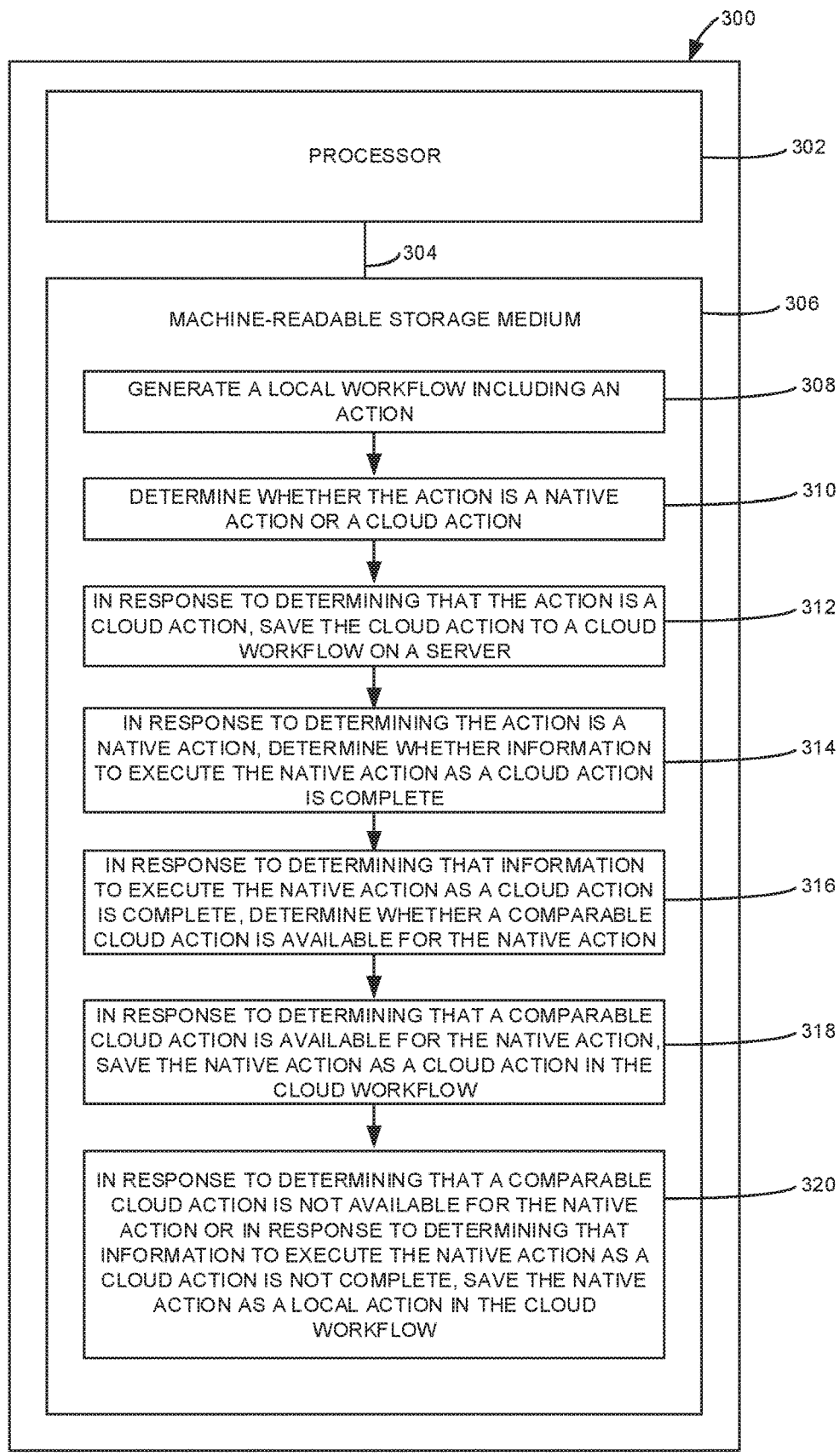
FIGS. 3A-3B are block diagrams illustrating one example of a user device processing system for generating cloud workflows from local workflows.
Figure 3B:
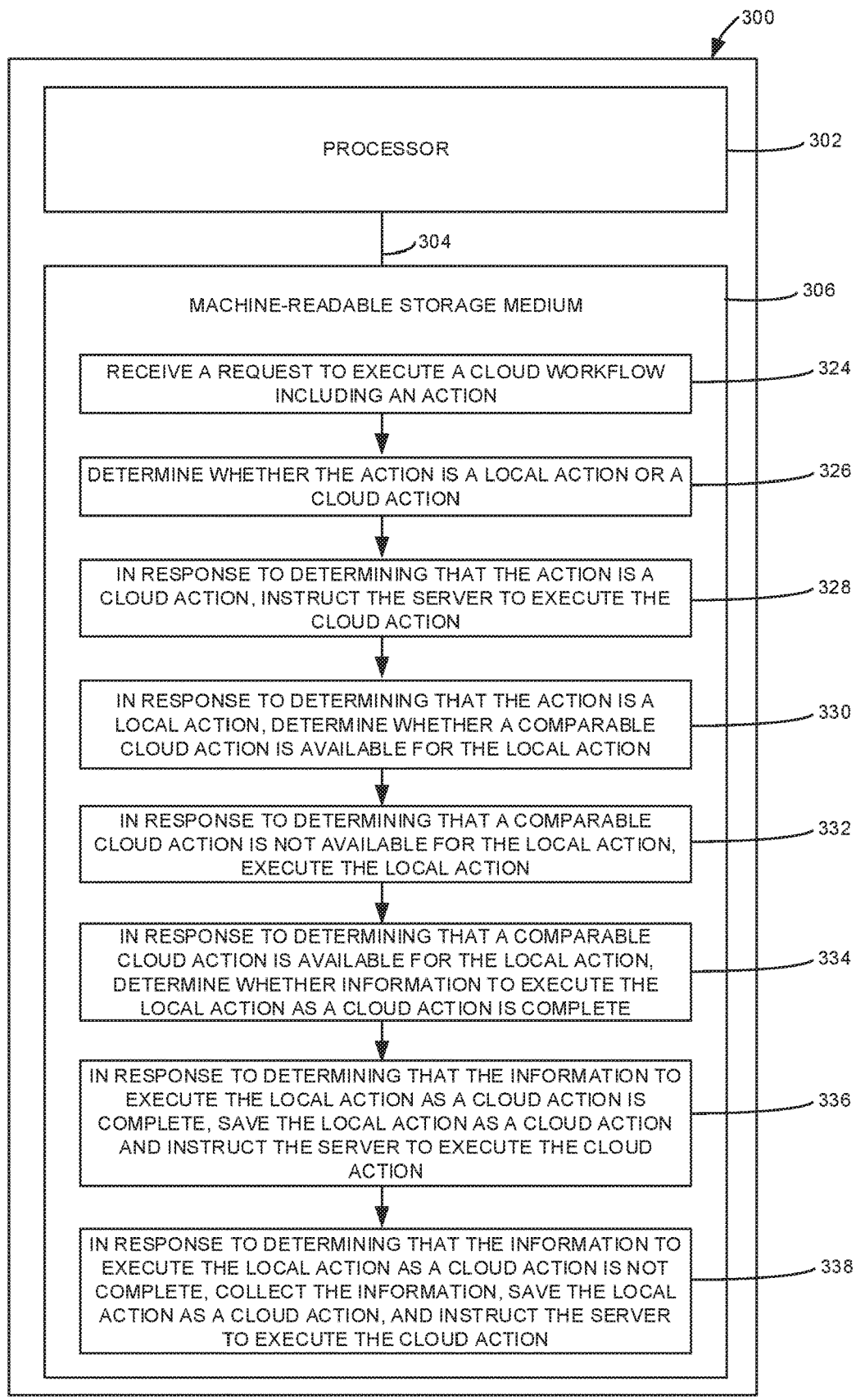

FIGS. 3A-3B are block diagrams illustrating one example of a user device processing system 300 for generating cloud workflows from local workflows. In one example, system 300 includes a user device, such as a user device 124 previously described and illustrated with reference to FIG. 1. System 300 includes a processor 302 and a machine-readable storage medium 306. Processor 302 is communicatively coupled to machine-readable storage medium 306 through a communication path 304. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 includes one CPU or microprocessor or more than one CPU or microprocessor, and/or other suitable hardware devices for retrieval and execution of instructions stored in machine-readable storage medium 306. Processor 302 may fetch, decode, and execute instructions 308-338 to generate cloud workflows from local workflows.

Processor 302 may fetch, decode, and execute instructions 308 to generate a local workflow including an action. Processor 302 may fetch, decode, and execute instructions 310 to determine whether the action is a native action or a cloud action. Processor 302 may fetch, decode, and execute instructions 312 to in response to determining that the action is a cloud action, save the cloud action to a cloud workflow on a server. Processor 302 may fetch, decode, and execute instructions 314 to in response to determining the action is a native action, determine whether information to execute the native action as a cloud action is complete.

Processor 302 may fetch, decode, and execute instructions 316 to in response to determining that information to execute the native action as a cloud action is complete, determine whether a comparable cloud action is available for the native action. Processor 302 may fetch, decode, and execute instructions 318 to in response to determining that a comparable cloud action is available for the native action, save the native action as a cloud action in the cloud workflow. Processor 302 may fetch, decode, and execute instructions 320 to in response to determining that a comparable cloud action is not available for the native action or in response to determining that information to execute the native action as a cloud action is not complete, save the native action as a local action in the cloud workflow.

As illustrated in FIG. 3B, processor 302 may fetch, decode, and execute further instructions 324 to receive a request to execute a cloud workflow including an action. Processor 302 may fetch, decode, and execute further instructions 326 to determine whether the action is a local action or a cloud action. Processor 302 may fetch, decode, and execute further instructions 328 to in response to determining that the action is a cloud action, instruct the server to execute the cloud action. Processor 302 may fetch, decode, and execute further instructions 330 to in response to determining that the action is a local action, determine whether a comparable cloud action is available for the local action.

Processor 302 may fetch, decode, and execute further instructions 332 to in response to determining that a comparable cloud action is not available for the local action, execute the local action. Processor 302 may fetch, decode, and execute further instructions 334 to in response to determining that a comparable cloud action is available for the local action, determine whether information to execute the local action as a cloud action is complete. Processor 302 may fetch, decode, and execute further instructions 336 to in response to determining that the information to execute the local action as a cloud action is complete, save the local action as a cloud action and instruct the server to execute the cloud action. Processor 302 may fetch, decode, and execute further instructions 338 to in response to determining that the information to execute the local action as a cloud action is not complete, collect the information, save the local action as a cloud action, and instruct the server to execute the cloud action.

As an alternative or in addition to retrieving and executing instructions, processor 302 may include one electronic circuit or more than one electronic circuit comprising a number of electronic components for performing the functionality of one of the instructions or more than one of the instructions in machine-readable storage medium 306. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 306 is a non-transitory storage medium and may be any suitable electronic, magnetic, optical, or other physical storage device that stores executable instructions. Thus, machine-readable storage medium 306 may be, for example, RAM, an EEPROM, a storage drive, an optical disc, and the like. Machine-readable storage medium 306 may be disposed within system 300, as illustrated in FIGS. 3A-3B. In this case, the executable instructions may be installed on system 300. Alternatively, machine-readable storage medium 306 may be a portable, external, or remote storage medium that allows system 300 to download the instructions from the portable/external/remote storage medium. In this case, the executable instructions may be part of an installation package.

Figure 4A:
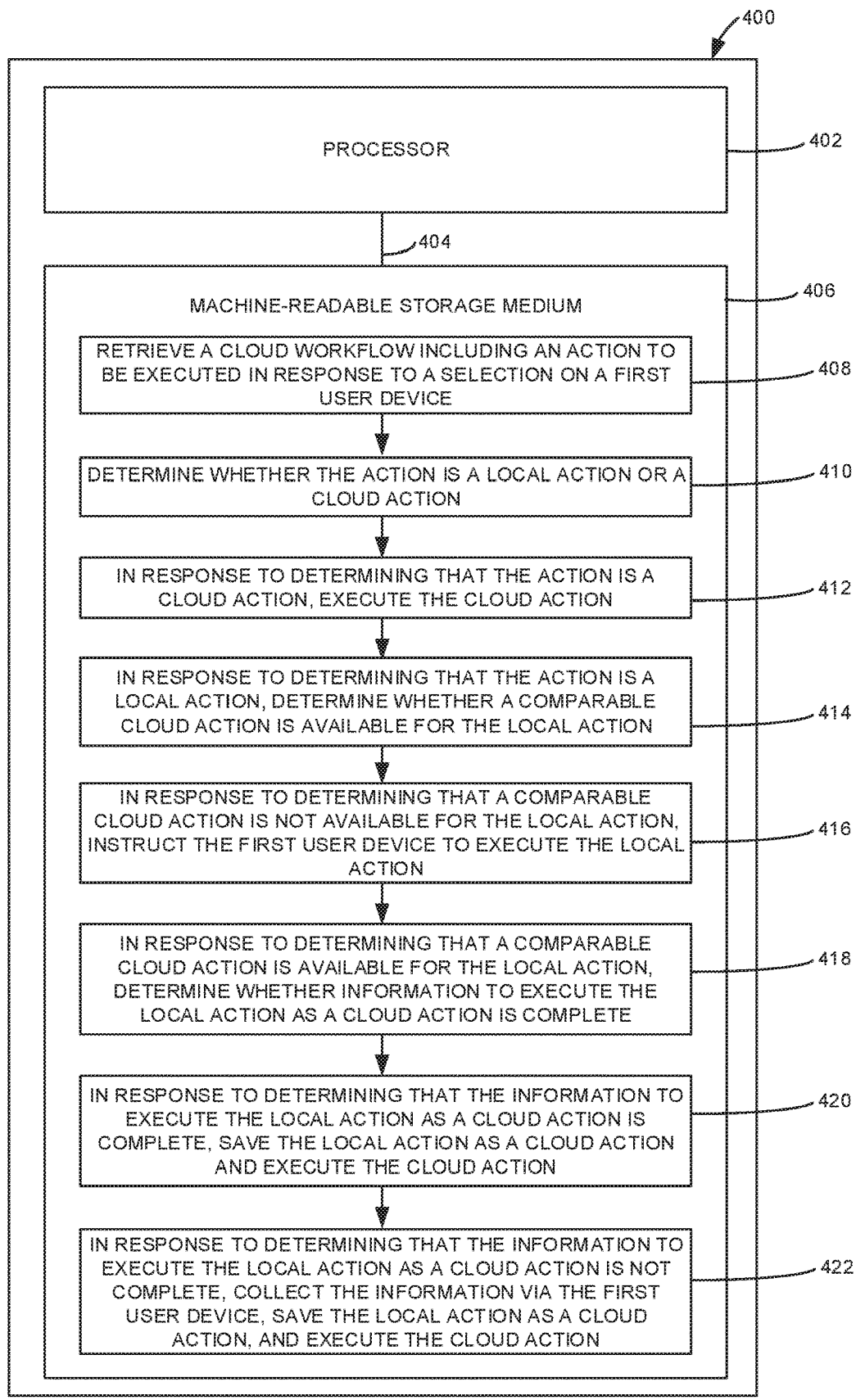
FIGS. 4A-4B are block diagrams illustrating another example of a cloud processing system for generating cloud workflows from local workflows.
Figure 4B:
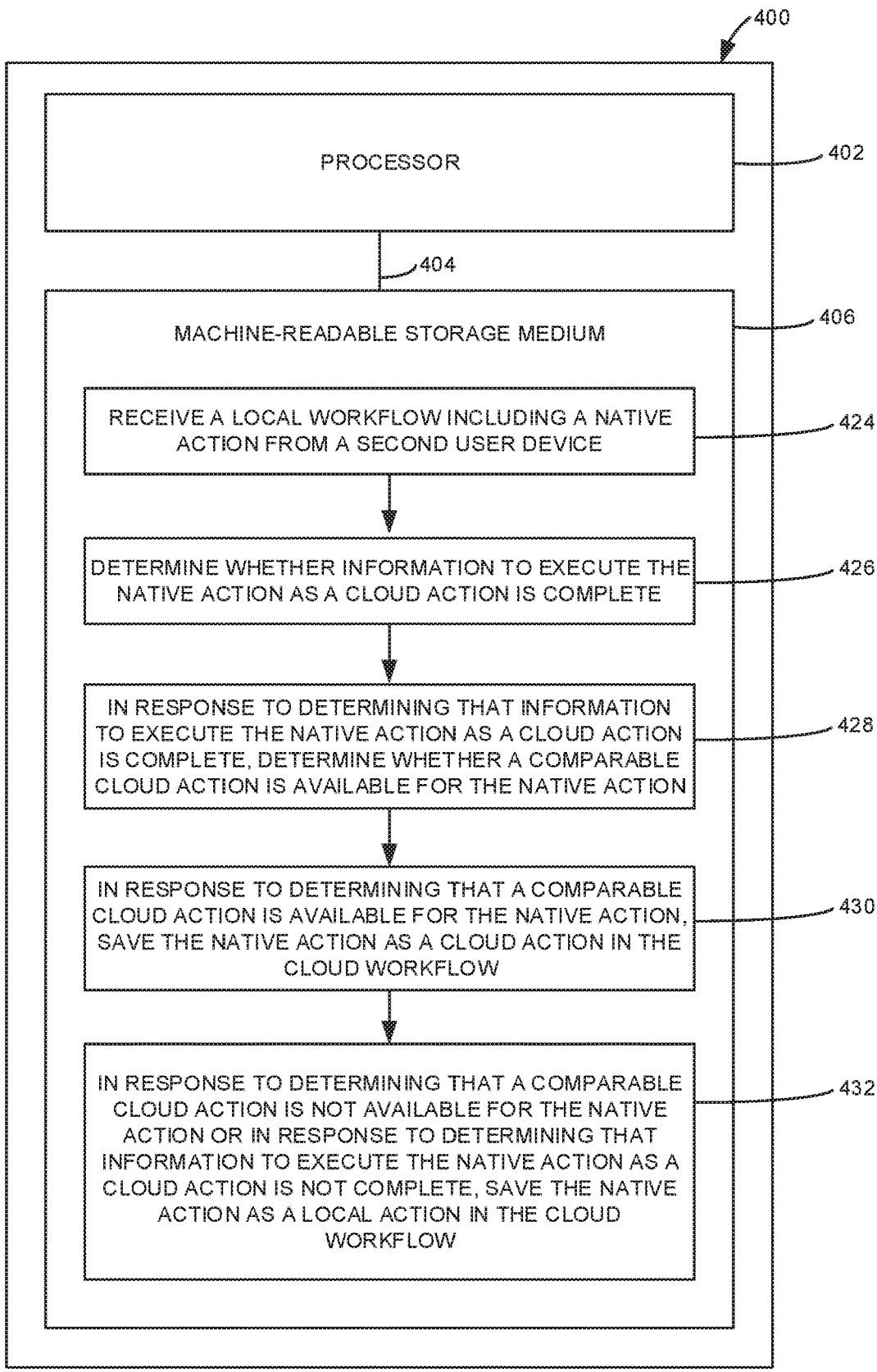

FIGS. 4A-4B are block diagrams illustrating another example of a cloud processing system 400 for generating cloud workflows from local workflows. In one example, system 400 includes a server, such as server 102 previously described and illustrated with reference to FIG. 1. System 400 includes a processor 402 and a machine-readable storage medium 406. Processor 402 is communicatively coupled to machine-readable storage medium 406 through a communication path 404. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 includes one CPU or microprocessor or more than one CPU or microprocessor, and/or other suitable hardware devices for retrieval and execution of instructions stored in machine-readable storage medium 406. Processor 402 may fetch, decode, and execute instructions 408-432 to generate cloud workflows from local workflows.

Processor 402 may fetch, decode, and execute instructions 408 to retrieve a cloud workflow including an action to be executed in response to a selection on a first user device. The cloud workflow may include a plurality of actions to be executed. The plurality of actions may include local actions and cloud actions. Processor 402 may fetch, decode, and execute instructions 410 to determine whether the action is a local action or a cloud action. Processor 402 may fetch, decode, and execute instructions 412 to in response to determining that the action is a cloud action, execute the cloud action. Processor 402 may fetch, decode, and execute instructions 414 to in response to determining that the action is a local action, determine whether a comparable cloud action is available for the local action.

Processor 402 may fetch, decode, and execute instructions 416 to in response to determining that a comparable cloud action is not available for the local action, instruct the first user device to execute the local action. Processor 402 may fetch, decode, and execute instructions 418 to in response to determining that a comparable cloud action is available for the local action, determine whether information to execute the local action as a cloud action is complete. Processor 402 may fetch, decode, and execute instructions 420 to in response to determining that the information to execute the local action as a cloud action is complete, save the local action as a cloud action and execute the cloud action. Processor 402 may fetch, decode, and execute instructions 422 to in response to determining that the information to execute the local action as a cloud action is not complete, collect the information via the first user device, save the local action as a cloud action, and execute the cloud action.

As illustrated in FIG. 4B, processor 402 may fetch, decode, and execute further instructions 424 to receive a local workflow including a native action from a second user device. Processor 402 may fetch, decode, and execute further instructions 426 to determine whether information to execute the native action as a cloud action is complete. Processor 402 may fetch, decode, and execute further instructions 428 to in response to determining that information to execute the native action as a cloud action is complete, determine whether a comparable cloud action is available for the native action. Processor 402 may fetch, decode, and execute further instructions 430 to in response to determining that a comparable cloud action is available for the native action, save the native action as a cloud action in the cloud workflow. Processor 402 may fetch, decode, and execute further instructions 432 to in response to determining that a comparable cloud action is not available for the native action or in response to determining that information to execute the native action as a cloud action is not complete, save the native action as a local action in the cloud workflow. Processor 402 may fetch, decode, and execute further instructions to link the cloud workflow to a user account.

As an alternative or in addition to retrieving and executing instructions, processor 402 may include one electronic circuit or more than one electronic circuit comprising a number of electronic components for performing the functionality of one of the instructions or more than one of the instructions in machine-readable storage medium 406. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 406 is a non-transitory storage medium and may be any suitable electronic, magnetic, optical, or other physical storage device that stores executable instructions. Thus, machine-readable storage medium 406 may be, for example, RAM, an EEPROM, a storage drive, an optical disc, and the like. Machine-readable storage medium 406 may be disposed within system 400, as illustrated in FIGS. 4A-4B. In this case, the executable instructions may be installed on system 400. Alternatively, machine-readable storage medium 406 may be a portable, external, or remote storage medium that allows system 400 to download the instructions from the portable/external/remote storage medium. In this case, the executable instructions may be part of an installation package.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a machine readable storage medium storing instructions; and
a processor to execute the instructions to:
receive a local workflow including a native action from a first user device;
determine whether information to execute the native action as a cloud action is complete;
in response to determining that information to execute the native action as a cloud action is complete, determine whether a comparable cloud action is available for the native action;
in response to determining that a comparable cloud action is available for the native action, save the native action as a cloud action in a cloud workflow; and
in response to determining that a comparable cloud action is not available for the native action or in response to determining that information to execute the native action as a cloud action is not complete, save the native action as a local action in the cloud workflow.

2. The system of claim 1, wherein the processor executes the instructions to further:
retrieve the cloud workflow including an action in response to a selection on a second user device;
determine whether the action is a local action or a cloud action;
in response to determining that the action is a cloud action, execute the cloud action;
in response to determining that the action is a local action, determine whether a comparable cloud action is available for the local action;
in response to determining that a comparable cloud action is not available for the local action, instruct the second user device to execute the local action;
in response to determining that a comparable cloud action is available for the local action, determine whether information to execute the local action as a cloud action is complete;
in response to determining that the information to execute the local action as a cloud action is complete, save the local action as a cloud action and execute the cloud action; and
in response to determining that the information to execute the local action as a cloud action is not complete, retrieve the information from the second user device, save the local action as a cloud action, and execute the cloud action.

3. The system of claim 1, wherein the processor executes the instructions to further:
receive the local workflow including the native action and a cloud action from the first user device; and
save the cloud action in the cloud workflow.

4. The system of claim 1, wherein the system comprises a server.

5. The system of claim 1, wherein the information comprises authentication data.

6. A system comprising:
a machine readable storage medium storing instructions; and
a processor to execute the instructions to:
generate a local workflow including an action;
determine whether the action is a native action or a cloud action;
in response to determining that the action is a cloud action, save the cloud action to a cloud workflow on a server;
in response to determining the action is a native action, determine whether information to execute the native action as a cloud action is complete;
in response to determining that information to execute the native action as a cloud action is complete, determine whether a comparable cloud action is available for the native action;
in response to determining that a comparable cloud action is available for the native action, save the native action as a cloud action in the cloud workflow; and
in response to determining that a comparable cloud action is not available for the native action or in response to determining that information to execute the native action as a cloud action is not complete, save the native action as a local action in the cloud workflow.

7. The system of claim 6, wherein the processor executes the instructions to further:
receive a request to execute a cloud workflow including an action;
determine whether the action is a local action or a cloud action;
in response to determining that the action is a cloud action, instruct the server to execute the cloud action;
in response to determining that the action is a local action, determine whether a comparable cloud action is available for the local action;
in response to determining that a comparable cloud action is not available for the local action, execute the local action;
in response to determining that a comparable cloud action is available for the local action, determine whether information to execute the local action as a cloud action is complete;
in response to determining that the information to execute the local action as a cloud action is complete, save the local action as a cloud action and instruct the server to execute the cloud action; and
in response to determining that the information to execute the local action as a cloud action is not complete, collect the information, save the local action as a cloud action, and instruct the server to execute the cloud action.

8. The system of claim 6, wherein the system comprises a user device.

9. The system of claim 6, wherein the system comprises an iOS device, a Mac OS device, an Android device, a Fire OS device, a Chrome OS device, or a Windows OS device.

10. The system of claim 6, wherein the system comprises a cellular telephone, a tablet, a printer, a desktop computer, a laptop computer, a smart speaker, or a smart display.

* * * * *